United States Patent [19]
Araujo et al.

[11] Patent Number: 6,118,785
[45] Date of Patent: Sep. 12, 2000

[54] POINT-TO-POINT PROTOCOL WITH A SIGNALING CHANNEL

[75] Inventors: Kenneth Araujo, Sunnyvale; Peter Si-Sheng Wang, Cupertino, both of Calif.

[73] Assignee: 3Com Corporation, Santa Clara, Calif.

[21] Appl. No.: 09/056,280

[22] Filed: Apr. 7, 1998

[51] Int. Cl.<sup>7</sup> ............................. H04L 12/28; H04L 12/66
[52] U.S. Cl. ......................... 370/401; 370/410; 370/466; 370/468
[58] Field of Search .................................... 370/400, 401, 370/402, 466, 468, 522, 524, 410

[56] References Cited

U.S. PATENT DOCUMENTS

| | | | |
|---|---|---|---|
| 4,965,798 | 10/1990 | Mostafa et al. | 370/468 |
| 5,563,882 | 10/1996 | Bruno et al. | 370/260 |
| 5,583,997 | 12/1996 | Hart | 395/200.15 |
| 5,657,452 | 8/1997 | Kralowetz et al. | 395/200.57 |
| 5,666,362 | 9/1997 | Chen et al. | 370/420 |
| 5,680,392 | 10/1997 | Semaan | 370/261 |
| 5,732,071 | 3/1998 | Saito et al. | 370/466 |
| 5,745,884 | 4/1998 | Carnegie et al. | 705/34 |
| 5,768,525 | 6/1998 | Kralowetz et al. | 395/200.58 |
| 5,818,838 | 10/1998 | Backes et al. | 370/390 |
| 5,822,523 | 10/1998 | Rothschild et al. | 395/200.17 |
| 5,867,660 | 2/1999 | Schmidt et al. | 395/200.57 |
| 5,870,386 | 2/1999 | Perlman et al. | 370/256 |
| 5,918,019 | 6/1999 | Valencia | 395/200.57 |
| 5,930,258 | 7/1999 | Solis et al. | 370/401 |
| 5,956,391 | 9/1999 | Melen et al. | 379/114 |
| 5,982,767 | 11/1999 | McIntosh | 370/352 |
| 6,029,203 | 2/2000 | Bhatia et al. | 709/244 |

OTHER PUBLICATIONS

Arunkumar, N. et al., "Layer Two Tunneling Protocol (L2TP) over AAL5 and FUNI", 3Com Corporation, Mar. 25, 1997, printed from world wide web site "http://www.internic.net/internet–drafts/draft–ietf–pppext–l2tp–aal5–funi–00.txt", 11 pages.

Simpson, W. (Editor), "PPP in HDLC–like Framing", Request for Comments 1662, Point–to–Point Protocol Working Group of the Internet Engineering Task Force (IETF), Jul. 1994, printed from world wide web site "http://ds.internic.net/rfc/rfc1662.txt", 53 pages.

Hamzeh, K. et al., "Layer Two Tunneling Protocol 'L2TP'", Nov. 1997, printed from world wide web site "http://www.internic.net/internet–drafts/draft–ietf–pppext–l2tp–08.txt", 132 pages.

Simpson, W. (Editor), "The Point–to–Point Protocol (PPP)", Request for Comments 1661, Point–to–Point Protocol Working Group of the Internet Engineering Task Force (IETF), Jul. 1994, printed from world wide web site "http://ds.internic.net/rfc/1661.txt", 108 pages.

*Primary Examiner*—Min Jung
*Attorney, Agent, or Firm*—David J. Weitz; Wilson Sonsini; Goodrich & Rosati

[57] ABSTRACT

A communication protocol designed for managing the communication between peers, such as the point-to-point protocol, includes a signaling channel in frames formatted according to the communication protocol. The signaling channel is utilized by intermediate devices in the access provider network, such as central office switches or other concentration points in the network to facilitate the management of the flow of data traffic in the access providers network. The signaling channel is identified in the intermediate devices and in the end stations, such as customer premises equipment or remote access servers, by a particular value in the Protocol field of the PPP encapsulation format for example. The intermediate device is configured to monitor the protocol field, and when the particular value is recognized, to process the frame at the intermediate device. Likewise, the end station is configured to recognize the particular value in the protocol field, and to process the packet received according to the signaling channel function specified by that particular value.

20 Claims, 8 Drawing Sheets

POINT-TO-POINT PROTOCOL WITH A SIGNALING CHANNEL

RELATED APPLICATIONS

This application is related to non-provisional application, entitled "Distribution Of Protocol Processes From Network Elements To End Stations," by inventors, Kenneth Araujo, Peter Si-Sheng Wang and Cheng Chen, having Ser. No. 09/056,281, and filing date Apr. 7, 1998, which was filed on the same day as the instant application (Attorney Docket No. 15886-143); and to non-provisional application, entitled "Session Establishment For Static Links In Point-to-Point Protocol Sessions," by inventors, Kenneth Araujo and Peter Si-Sheng Wang having Ser. No, 09/056,258, and filing date Apr. 7, 1998, which was filed on the same day as the instant application (Attorney Docket No. 15886-141); and to non-provisional application, entitled "Enabling Multicast Distribution Efficiencies In A Dialup Access Environment," by inventors Kenneth Araujo, Peter Si-Sheng and Cyndi Jung having Ser. No. 09/056,284, and filing date Apr. 7, 1998, which was filed on the same day as the instant application (Attorney Docket No. 15886-157).

BACKGROUND OF THE INVENTION

1. Field of the Invention

The present invention relates to data communications, and more particularly to techniques for improving the flexibility and useability of point-to-point communication protocols, such as the Point-to-Point Protocol (PPP).

2. Description of Related Art

The Point-to-Point Protocol, as it is defined, is used for transporting multi-protocol datagrams over point-to-point links. One version of the PPP is described in Request For Comments RFC 1661, published July 1994 by the Point-to-Point Protocol Working Group of the Internet Engineering Task Force IETF. The PPP consists of a specification for encapsulating multi-protocol datagrams, a link control protocol LCP for establishing, configuring and testing the datalink connection, and a family of network control protocols NCPs for establishing and configuring different network layer protocols. According to the PPP, network layer packets are referred to as datagrams. The datagrams are passed to the datalink layer in which they are encapsulated according to the PPP in a packet having a packet header. The packet including the PPP fields and the datagram is passed to the physical layer at which framing such as HDLC-like framing is appended to form a frame in the format received at the physical layer interface. So called HDLC-like framing is described in "PPP in HDLC-like Framing" RFC 1662 published July 1994 by the Point-to-Point Protocol Working Group of the IETF. Other kinds of framing are also used with the PPP, including framing designed to cooperate with asynchronous transfer mode ATM protocols widely used in the public switched telephone network for data communications. For example, ATM framing and FUNI framing are utilized. Upon reception, the frame is stripped of its framing fields, and a packet is passed to the datalink layer. The packet is stripped of its control fields to produce a datagram. The datagram is passed to the network layer at which network layer headers and the like are processed. Use of the PPP provides a simple technique for encapsulating data from a variety of protocols and is used for example across telephone lines between end stations and Internet access providers.

PPP sessions are established between peers. In one typical environment, the peers include equipment located at a customer site referred to as customer premises equipment CPE, and a remote access server RAS operated by an Internet Service Provider ISP. The customer dials a telephone number to access the RAS of the Internet Service Provider. For some modem types, such as the asynchronous digital subscriber loop ADSL (running PPP in HDLC framing over ADSL), the CPE has a static link to a RAS, without requiring dial up. The PPP is utilized to establish the peer to peer connection from the CPE to the RAS.

Local loops connect modems at customers premises to a central office switch on the public switched telephone network. At the central office switch, the telephone connection is routed to its destination, either directly or through other equipment in the network. As data traffic increases, the companies that provide access to Internet Service Providers across their telephone networks (access providers) are diverting the data traffic off of the voice networks into networks more suited for data traffic or packet switched traffic. Thus, the central office switches are configured with a concentrator and multiplexer for data traffic which is split off of the voice traffic. The communication of the data traffic from the central office switch to a remote access server or other destination is processed by the concentrator/multiplexer to optimize use of the access provider's available bandwidth. For example, access providers are beginning to deploy equipment that diverts calls destined for Internet Service Providers off of the voice switching network, which terminates calls, extracts PPP packets and encapsulates the packets within logical connections in a tunnel. A tunnel is a communication channel which operates according to a tunneling protocol, including the point-to-point tunneling protocol PPTP, the layer 2 forwarding protocol L2F, the layer 2 tunneling protocol L2TP and equivalent protocols. The logical connections within a tunnel are used as a means for multiplexing the data from several users into a single tunnel.

In addition to tunneling, a variety of other techniques are utilized by the access providers to manage the flow of data through their networks.

Problems associated with these techniques arise from the increasing amount of data traffic, from the complexity of the processes required to handle the diversion of such traffic on the data networks, and from the need for efficient use of the data networks by the access providers. These problems can be addressed by increasing the processing resources located at the central offices or other intermediate switches in the access provider network. However, this solution is costly and difficult to deploy.

Accordingly, it is desirable to provide a technique supporting efficient use of access provider networks for point-to-point protocols, while minimizing the amount of processing resources needed in the access provider network itself to manage traffic flow.

SUMMARY OF THE INVENTION

The present invention improves a communication protocol designed for managing the communication between peers, such as the point-to-point protocol, by including a signaling channel in frames formatted according to the communication protocol. The signaling channel is utilized by intermediate devices in the access provider network, such as equipment at central office switches or other concentration points in the network, to facilitate the management of the flow of data traffic in the access provider network. Thus, the signaling channel is used by resources for managing use of bandwidth in the access provider network. The signaling channel according to one aspect of the invention is identified in the intermediate devices and in the end stations, such as customer premises equipment or remote access servers, by a particular value or values in the protocol field of the PPP encapsulation format. The intermediate device is configured to monitor the protocol field, and when one of the particular values is recognized, to process the frame at the intermediate device. Likewise, the end station is configured to recognize particular values in the protocol field, and to process the packet received according to the signaling channel function specified by that particular value. Such a signaling channel is used to achieve a number of goals in managing the use of bandwidth in the access providers network, including:

1. The signaling channel is used to distribute protocol processing functions, such as edge functions for tunnel protocols, used for transport of PPP data through the access provider network, to the end stations, without requiring the end stations to be aware of the intricacies of the protocol involved.
2. The signaling channel is used to realize multicast distribution efficiencies in the access provider network.
3. The signaling channel is used in conjunction with a network address translator NAT at customer premises to enable a unique user identification when all users are attached to the outside world through the NAT and a single Internet Protocol IP address or a small set of IP addresses.
4. The signaling channel is used in cases where PPP is used over constant access links (like asynchronous digital subscriber loop ADSL), and the accompanying protocol stack has no signaling mechanism for out-of-band session establishment, to setup individual sessions to different destination end stations such as different Internet Service Providers.

Accordingly, the present invention can be characterized as a method for improving network performance in a system including a network, such as an access provider backbone data network, having one or more intermediate devices, such as central office switches, coupled to end stations by respective links, and through which a point-to-point data channel is established from a first end station through at least a first intermediate device, and through the network to a second end station. The point-to-point data channel operates according to a communication protocol such as PPP between the first and second end stations. The intermediate device includes resources for managing use of bandwidth in the network. A method for improving network performance according to the present invention comprises the steps of detecting in the intermediate device data frames in the point-to-point data channel formatted according to the first communication protocol; processing said data frames in the intermediate device for transmission through the network using resources for managing use of network bandwidth; and transmitting from the first intermediate device to at least one of the first end station, another intermediate device, and the second end station information related to the management of network bandwidth in a data frame formatted according to the first communication protocol.

According to one aspect of the invention, the processing of data frames in the intermediate device includes encapsulating said data packets from the frames according to a second communication protocol for transmission through at least a portion of the network. In this case, the information related to management of network resources includes data enabling the first end station to reduce processing steps required by the network intermediate device to encapsulate data packets. For example, the first end station can append certain framing data, control data or other header data on the packets encapsulated in the basic framing according to the first communication protocol.

Where the point-to-point communication channel is operated according to the point-to-point protocol PPP, the data frames include a reserved field, and the first intermediate device transmits a PPP frame to the end station, or vice versa, including a code in the reserved field indicating that a signal relating to management of network resources is carried in the data frame. In a preferred implementation, the reserved field comprises the protocol field specified for PPP protocol identification functions according to the standard encapsulation techniques. Alternatively, or in combination, framing fields, such as the HDLC-like frames address or control fields could be utilized.

According to yet other aspects of the invention, the resources for management of network bandwidth comprise resources for executing tunneling protocols through the access provider network, including for example the layer 2 tunneling protocol, the layer 2 forwarding protocol, and the point-to-point tunneling protocol. This step of encapsulating the packets formatted according to point-to-point communication protocol at intermediate devices includes in one aspect of the invention the process of generating encapsulation data supporting tunneling protocol or other transport mechanisms to the access provider network, and constructing network data packets that include encapsulation data or have other formatting peculiarities. In this case, the information relating to the management of the network resources that is transferred to the end station from the intermediate device includes data enabling the end station to provide at least a portion of the encapsulation data in the data frames formatted according to the point-to-point communication protocol. For example, the information sent to the end station may include actual segments of the encapsulation data, or information by which the end station is enabled to compute the encapsulation data itself.

According to another aspect of the invention, the resources for management of network bandwidth at the intermediate station includes multicast distribution resources by which a single multicast frame from an end station is forwarded to a plurality of recipients by the intermediate device. In this case, the information transferred to the end station from the intermediate device includes information related to the multicast distribution resources, such as data related to the multicast packets.

According to other aspects of the invention, the end station is capable of generating a data frame formatted according to the point-to-point communication protocol including signaling channel codes, and transmitting such data frame through the network on the established channel. The intermediate device receives the data frame, and processes the information that originated in the end station that relates to the management of network bandwidth. For example, the end station may generate control packets used in the process of moving functions from the network intermediate device to the end station that relate to the management of network bandwidth.

The invention can also be characterized from the point of view of the end station participating in the signaling channel. According to this aspect, the method for improving network performance includes establishing point-to-point data channel for carrying data frames formatted according to a peer-to-peer communication protocol system, like the PPP protocol. The step of establishing the point-to-point data channel is executed by communication from the end station to another end station in the network, and may be facilitated by the network intermediate device. According to the present invention, in the point-to-point data channel which has been established, the end station transmits a data frame formatted according to the communication protocol of the point-to-point data channel, including information directed to the intermediate device that is related to managing use of network resources, such as the resources discussed above.

Accordingly, the point-to-point protocol PPP or other point-to-point communication protocol is extended according to the present invention by including a signaling channel by which various efficiencies can be achieved in an access provider network through which the point-to-point channel is established. The efficiencies include distributing protocol processing functions to the end points off of the intermediate devices, achieving multicast distribution efficiencies in the access provider network by enabling intermediate devices to perform concentration and distribution functions, extending network address translator NAT functions to allow individual user identification while using a small number of global IP addresses, and ISP selection and session identification for constant access links, like the PPP formatted links over ADSL, without requiring a session establishment protocol. The efficiencies achieved by use of the signaling channel can reduce congestion in network equipment arising because of the extra protocol processing load on the intermediate devices, inefficient multicast distribution, limited user visibility behind a NAT, and inability to dynamically select an Internet Service Provider on constant access links.

Other aspects and advantages of the present invention can be seen upon review of the figures, the detailed description, and the claims which follow.

DETAILED DESCRIPTION

Figure 1:
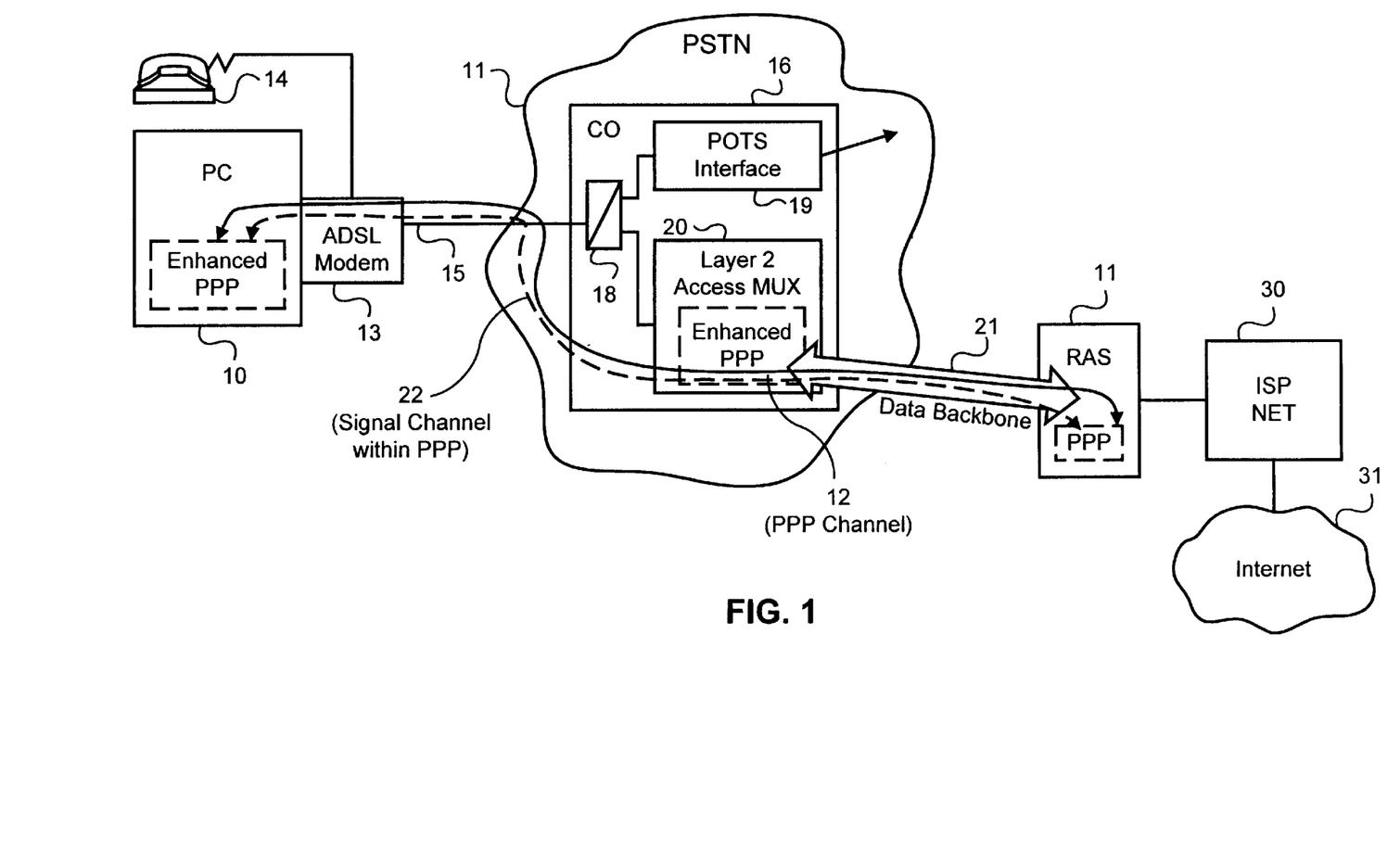
FIG. 1 a simplified diagram of an example network environment in which enhanced point-to-point protocol of the present invention is implemented.

A detailed description of examples of the present invention is provided with reference to the figures, in which FIG. 1 illustrates a context in which the present invention is used.

FIG. 1 illustrates a point-to-point connection between peer end stations, in this example a personal computer 10 and a remote access server 11. The point-to-point communication session in this example is represented by the arrow 12 established according to the point-to-point protocol PPP. The personal computer 10 includes a modem 13, which in a preferred embodiment is a high throughput modem such as an asynchronous digital subscriber loop ADSL modem. The modem 13 is connected to a telephone line which optionally can be shared with a standard telephone equipment 14. The modem 13 is connected by a local loop medium such as link 15 to a central office switch 16 in the public switched telephone network PSTN represented by the cloud 17. The central office switch 16 includes a splitter 18 by which data traffic is split, physically or logically, from voice traffic. The voice traffic is supplied to an interface for voice traffic through the network 17 such as a POTS (plain old telephone service) interface 19. Data traffic is routed from splitter 18 to an access multiplexer 20 for connection to a data network managed by the telephone access provider. Alternatively, the function of the splitter can be integrated into the line card of the access mulitplexer. Under this scenario, the voice traffic is separated from the data traffic by the access multiplexer. Several voice streams may be multiplexed together by the access multiplexer and sent via one or more interfaces to the PSTN. Similarly, data traffic would be sent over interfaces connected to the carrier's broadband backbone network.

Typically the access multiplexer 20 operates at layer 2 of the network protocol stack, or otherwise operates as a network intermediate device. The access multiplexer 20 provides an edge device for a data backbone network 21 which is coupled to the remote access server 11. The point-to-point session 12 is established from the personal computer 10 through the splitter 18 and access multiplexer 20, across the data backbone 21, such as an ATM virtual circuit, to the remote access server 11. The remote access server 11 in this example is coupled to an Internet service provider network 30, which includes for example a server "farm". The Internet service provider network is in turn coupled to the Internet 31.

The personal computer includes an enhanced point-to-point protocol module according to the present invention. Also the access multiplexer 20 includes an enhanced point-to-point protocol processing module to handle the signaling channel according to the present invention. The remote access server 11 includes a point-to-point protocol module (preferably but not necessarily enhanced according to the present invention) and operates as the end point, or peer, for the point-to-point session 12. According to the present invention, a signaling channel within the point-to-point protocol session is included, represented by the dashed line 22. The access multiplexer will continuously monitor for point-to-point frames (prior to establishment of the point-to-point session, during establishment of the point-to-point session, and upon establishment the point-to-point session). For example, for the PPP-ATM-ADSL case, this monitoring could start once the CONNECT message was sent from the access multiplexer to the CPE. Point-to-point protocol frames carrying a code indicating that they are signaling channel frames are then processed in the enhanced PPP module in the access multiplexer 20.

The signaling channel is identified by a particular value or values in the protocol field of the standard PPP encapsulation, in a preferred example. Alternatively or in combination, other fields, such as the address field of the HDLC-like framing standard for PPP packets are used to identify signaling channel frames. The signaling channel can be used to achieve a number of functions referred to as edge functions, that are relevant to assisting the access multiplexer 20 in the management of network traffic. For example, the signaling protocol can be used to distribute protocol processing functions which are required for transferring the PPP frames across the data backbone 21 to the end points, without requiring the end points to be aware of the intricacies of the protocol on the data backbone 21. The signaling channels can be used to realize multicast distribution efficiencies by transferring multicast filtering and distribution functions from the end stations to the access multiplexer 20. The signaling channel can be used in conjunction with a network address translator at customer premises to enable unique user identification, even though all users are attached to the outside world via the NAT at a single IP address, or a small set of IP addresses. In addition, for cases where the point-to-point link is used over static, constant access links such as ADSL, and in which the accompanying protocol stack has no signaling mechanism for out-of-band session establishment, the definition of a signaling channel as part of the PPP can be used for setup of individual sessions to different ISPs or other peers.

FIG. 1 represents a typical setup for access by a consumer using equipment at the consumers premises to the Internet 31 via an Internet service provider. It can be appreciated when a large number of end stations, such as the personal computer 10, access the single remote access server 11 through an access multiplexer 20, the access multiplexer must have significant processing resources to manage the edge functions. In addition, for multicast traffic originating from a remote access server 11, a large number of point-to-point channels must be utilized for each destination of the multicast packet. By utilizing the signaling channel, the access multiplexer can learn about the multicast needs of CPEs. It can then interact with the RAS, so that a single feed frame the RAS can be distributed and filtered to the appropriate CPEs. The interaction with the RAS could have the access multiplexer acting as a proxy for the multicast feed.

The environment of FIG. 1 is a simplified depiction. In some environments, the remote access server 11 is also coupled to the PSTN 17 through a central office switch. Also, the access multiplexing functions executed by the access multiplexer 20 and the data backbone 21 are implemented in some networks between intermediate devices other than central office switches to concentrate traffic over high bandwidth links within the PSTN, which may not be directly coupled to a central office switch. For example, the intermediate device at which the signaling channel is processed may be a router or an ATM switch located in the access provider network. Data from several access multiplexers may be aggregated in the intermediate device which processes the signaling channel.

Figure 2:
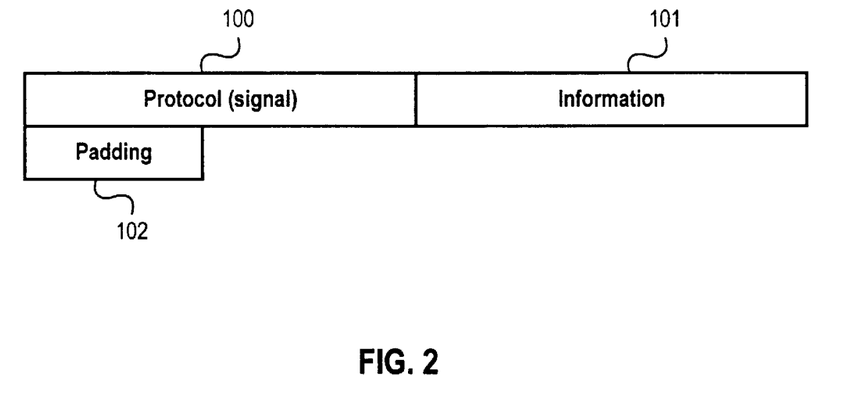
FIG. 2 is a diagram of a packet formatted according to the point-to-point protocol enhanced according to the present invention.

In a PPP session, packets are formatted according to specifications defining the fields shown in FIG. 2. The Protocol field 100 is one or two octets, and its value identifies the datagram encapsulated in the Information field 101 of the packet. For example, if the Protocol field has a value indicating IP, the Information field will contain an IP packet. The Protocol can have other defined values. For example, there is a value indicating a Link Control Protocol (LCP) frame. Such a packet is used by the end points of the PPP session, to agree upon encapsulation format options, handle varying limits on sizes of packets, etc.

The Information field 101 is zero or more octets. The Information field 101 contains the datagram for the protocol specified in the Protocol field 100. The maximum length for the Information field 101, including Padding 102, but not including the Protocol field 100, is termed the Maximum Receive Unit (MRU), which defaults to 1500 octets. By negotiation, consenting PPP implementations may use other values for the MRU.

Figure 3:
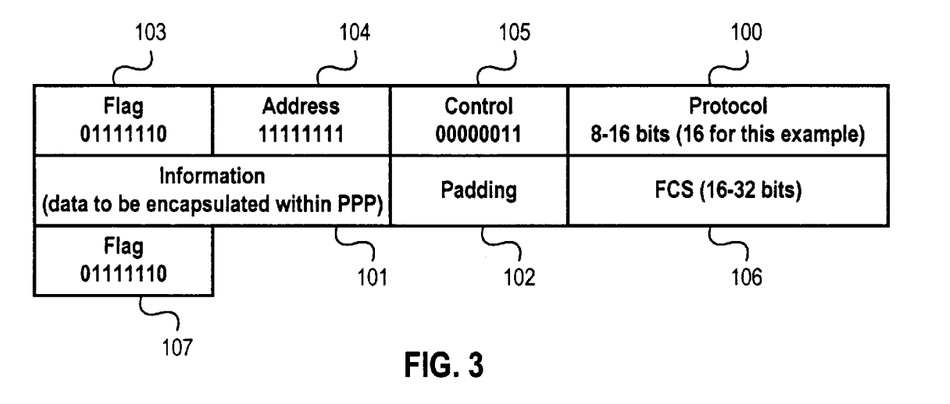
FIG. 3 is a diagram of a frame formatting accorded to the HDLC-like framing over the point-to-point protocol.

When sending the PPP packet as shown in FIG. 2 over an ADSL link, which is a bit-synchronous link, the PPP packet is encapsulated within an HDLC frame as shown in FIG. 3 for the PPP-ADSL stack. The Protocol, Information, and Padding fields shown in FIG. 3 are the PPP fields that were described in FIG. 2. Alternatively, the PPP packet will be adapted using AAL5 adaptation and then segmented into ATM cells over the ADSL link (if the PPP-ATM-ADSL stack is being used). A third alternative, which is the PPP-FUNI-ADSL stack, also uses encapsulation based on HDLC, but with different allowed values for certain fields than for PPP-ADSL.

FIG. 3 shows the encapsulation of PPP within HDLC framing. An HDLC frame is started by a flag sequence 103 of '01111110' binary. It is followed by an Address field 104; the only defined value according to the standard that the Address field can have is '11111111' binary. Following the Address field 104 is a Control field 105 with a value of '00000011' binary. Following the Control 105 field is are the PPP Protocol field 100, the PPP Information field 101, and the PPP Padding 102. This is followed by a Frame Check Sequence 106 for the HDLC frame which can be 16 bits or 32 bits. Finally, the HDLC frame is terminated by a closing Flag sequence 107 of '01111110' binary.

Frames belonging to the signaling channel will be identified via a special value, presently not assigned for other uses, of the Protocol field within the PPP encapsulation shown in FIG. 2. For example, a Protocol Field of 16 bits with a value of '1001000000000001' binary could be used to identify a PPP frame associated with the signaling channel.

Figure 4:
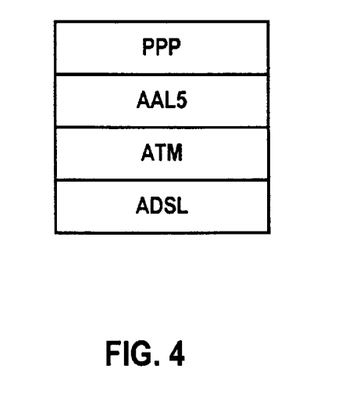
FIG. 4 is an illustration of a protocol stack providing for ATM over AAL5 framing of a point-to-point protocol on an ADSL link.

According to the present invention, the access multiplexer 20 includes resources for identifying PPP frames such as those illustrated in FIGS. 2–4 which carry a signaling protocol value in the protocol field. Such resources include, hardware comparators which compare data at a specific offset within each frame to one or more hard coded values, software resources which perform the comparison function, and combinations of hardware and software. Hardware comparators are preferred in systems requiring fast decisions, or in systems having low processing resources. Software comparison techniques provide greater flexibility and other advantages. In addition to resources for recognizing frames which are part of the signaling channel, the access multiplexer 20 includes an enhanced PPP module that performs the functions specified by this signaling channel frames.

One of the protocol stacks that has been approved for ADSL consists of sending PPP frames using ATM's AAL5 encapsulation of ATM cells running over an ADSL link. FIG. 4 shows the relevant protocol stack.

Figure 5:
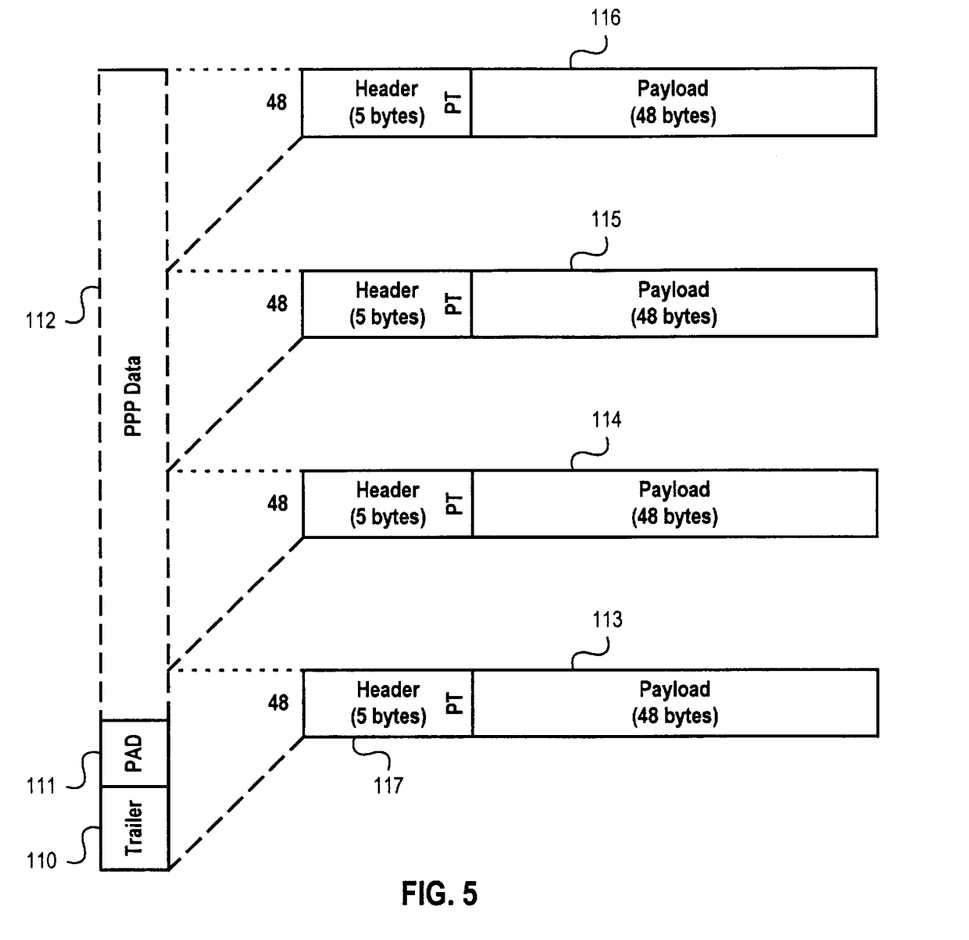
FIG. 5 illustrates the segmenting of a PPP packet into cells using AAL5 encapsulation.

Before segmentation into ATM cells, the PPP data has the format shown in FIG. 2. FIG. 5 depicts the way the segmentation occurs using AAL5. AAL5 consists of adding a trailer 110 to the PPP packet 112. This trailer 110 includes the following fields:

A CPCS UU filed of 1 byte.

A CPI field of 1 byte.

A Length field of 2 bytes.

A CRC of 4 bytes.

The trailer is 8 bytes. Before the trailer 110, PAD bytes 111 are used so that the length of the total frame that is to be converted into cells is a multiple of 48 bytes. The frame is then segmented into cells 116, 115, 114, 113 and so on.

The 5 byte Header (e.g. 117) of each cell contains the Virtual Circuit (VC) information associated with the VC on which the data is being sent. Also included in the header is a PT field which has a specific bit dedicated to AAL5 encapsulation. This bit of the PT field is used in the AAL5 encapsulation to indicate whether or not a cell is the last cell associated with a segmented frame. It is set to '0' in all cells associated with the frame except the last cell, where it is set to '1'.

The ATM Virtual Circuit is terminated at the Access Multiplexer. The Access Multiplexer may take the data from several different CPE and send it on a single, aggregated VC to the ISP Remote Access Server (RAS). This is done to prevent Virtual Circuit explosion in the core of the carrier network (between the access multiplexer and the ISP RAS).

When taking the data from several CPE and multiplexing it onto one VC to the ISP RAS, or taking data associated with several different VCs from a single CPE where each VC carries data from a single PPP session and multiplexing it onto one VC to the ISP RAS, or any combination of the preceding two possibilities, it is necessary to use some multiplexing scheme over the single VC to the RAS so as to be able to identify and separate the data belonging to different PPP sessions. An example of such a multiplexing scheme is the Layer 2 Tunneling Protocol (L2TP).

Figure 6:
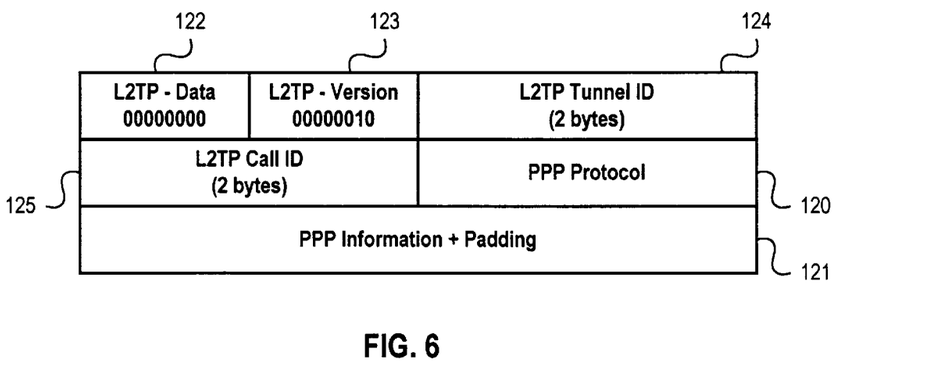
FIG. 6 illustrates encapsulation according to the layer 2 tunneling protocol.

FIG. 6 shows the minimal encapsulation for PPP data packets sent between two L2TP endpoints. For our example, the two endpoints will be the access multiplexer and the ISP RAS. The access multiplexer will multiplex multiple PPP sessions onto a single virtual circuit by using L2TP. The minimal L2TP encapsulation consists of prefixing the PPP packet 120, 121 with a 6-byte L2TP header. The first byte 122 in this encapsulation is set to all zeroes, which indicates an L2TP payload packet using no length field, no send sequence number, and no receive sequence number. The second byte 123 is set to a value of binary '00000010', which is the present L2TP version. The next two bytes 124 are used to define an L2TP Tunnel. An L2TP Tunnel exists between 2 endpoints. Multiple logical connections may be associated with a particular tunnel. Each logical session is defined via the L2TP Call ID 125. PPP data belonging to a particular session from a particular CPE is mapped one-to-one to a particular L2TP Tunnel and logical connection via the L2TP Tunnel ID and L2TP Call ID bytes.

Note that there are two parallel components of L2TP operating over a given L2TP tunnel—control messages between the two tunnel endpoints, and payload packets sent between the endpoints. The payload packets are used to transport L2TP encapsulated PPP packets for user sessions between the tunnel endpoints. The structure of such packets is what is shown in FIG. 6 and what was described earlier.

The actual assignment of Call IDs within a tunnel is accomplished via the exchange of control messages between tunnel endpoints. A control message is indicated by having a value of '1' in the highest order bit of the first byte 112 of an L2TP packet (as opposed to a value of zero, which signifies a payload packet). Independent Call ID values are established for each end of a user session. The sender of a packet associated with a particular session places the Call ID established by its peer in the Call ID header field 125 of all outgoing packets.

Figure 7:
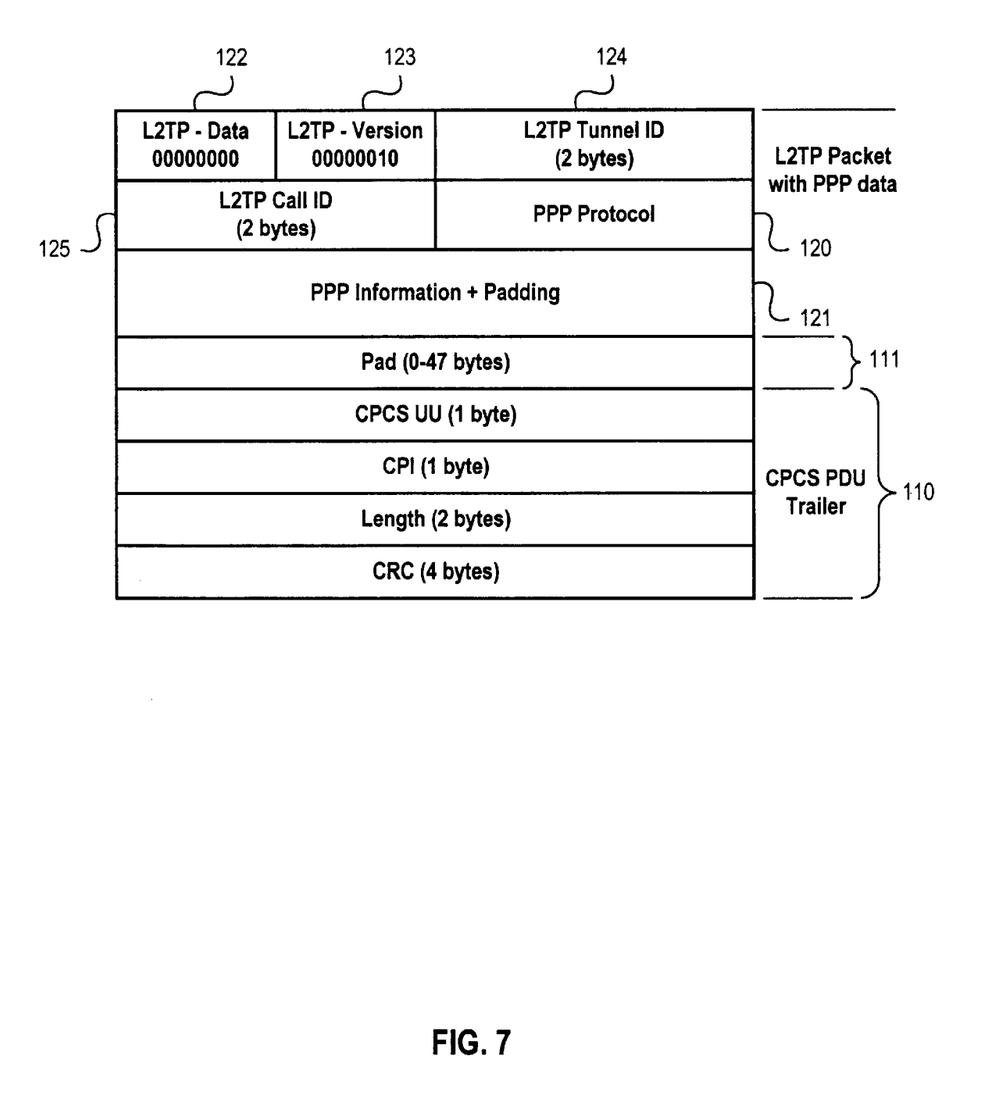
FIG. 7 illustrates the AAL5 adaptation of a layer 2 tunneling protocol L2TP frame.

FIG. 7 shows how the L2TP packet containing the PPP data is encapsulated using AAL5 encapsulation before being segmented into ATM cells using the reference numbers of FIGS. 5 and 6.

Figure 8:
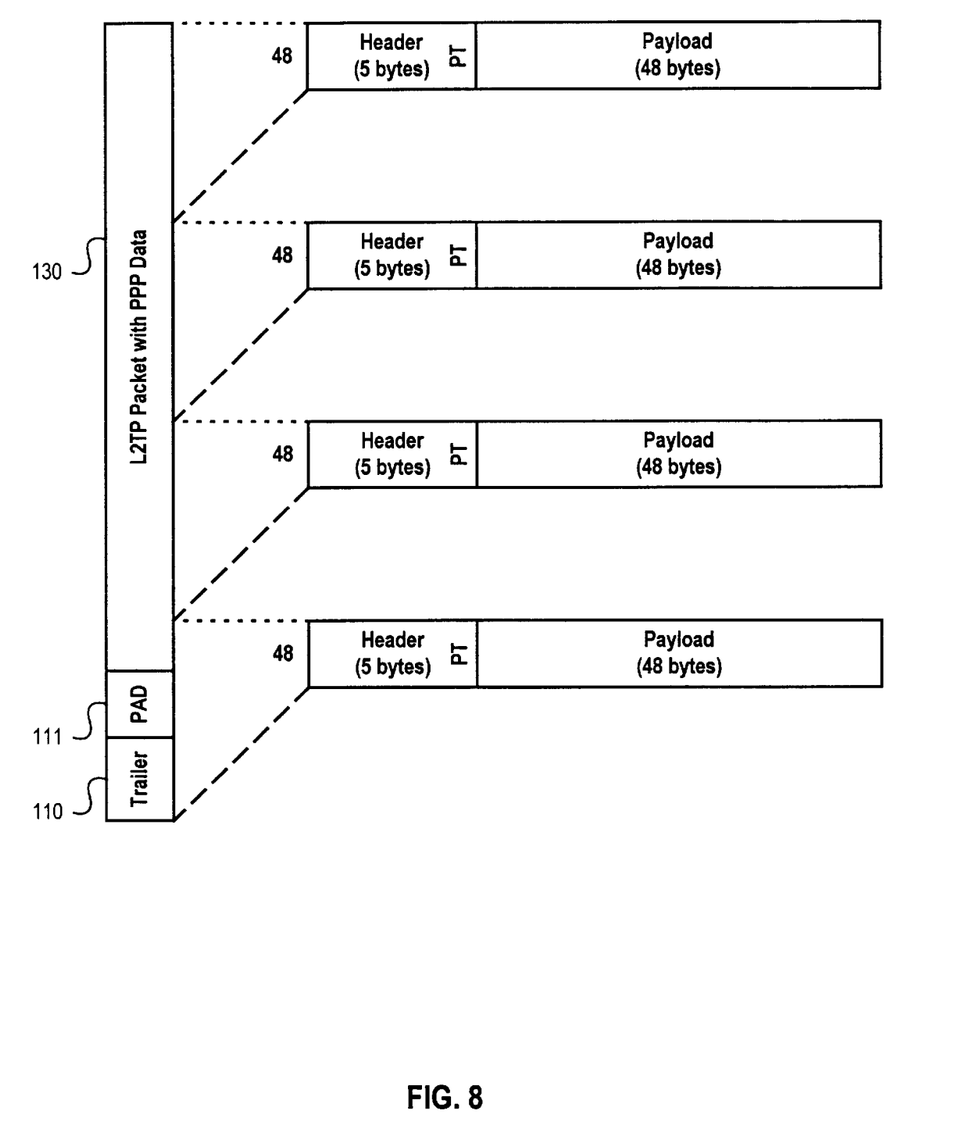
FIG. 8 illustrates the process of sending AAL5 adapted data on a virtual circuit between an access multiplexer and an ISP RAS.

The resulting AAL5 frame is then segmented as shown in FIG. 8.

Note the similarity of FIG. 8 to FIG. 5. In FIG. 5, PPP data from ADSL endpoints was adapted using AAL5 for transmission across a particular VC. In FIG. 8, PPP data from several ADSL endpoints is sent from the access multiplexer to the ISP RAS. This is why the extra L2TP encapsulation (packet 130) is needed—this encapsulation allows for multiplexing the data from the different PPP sessions, where each session will be identified by a unique Tunnel ID and Call ID.

Figure 9:
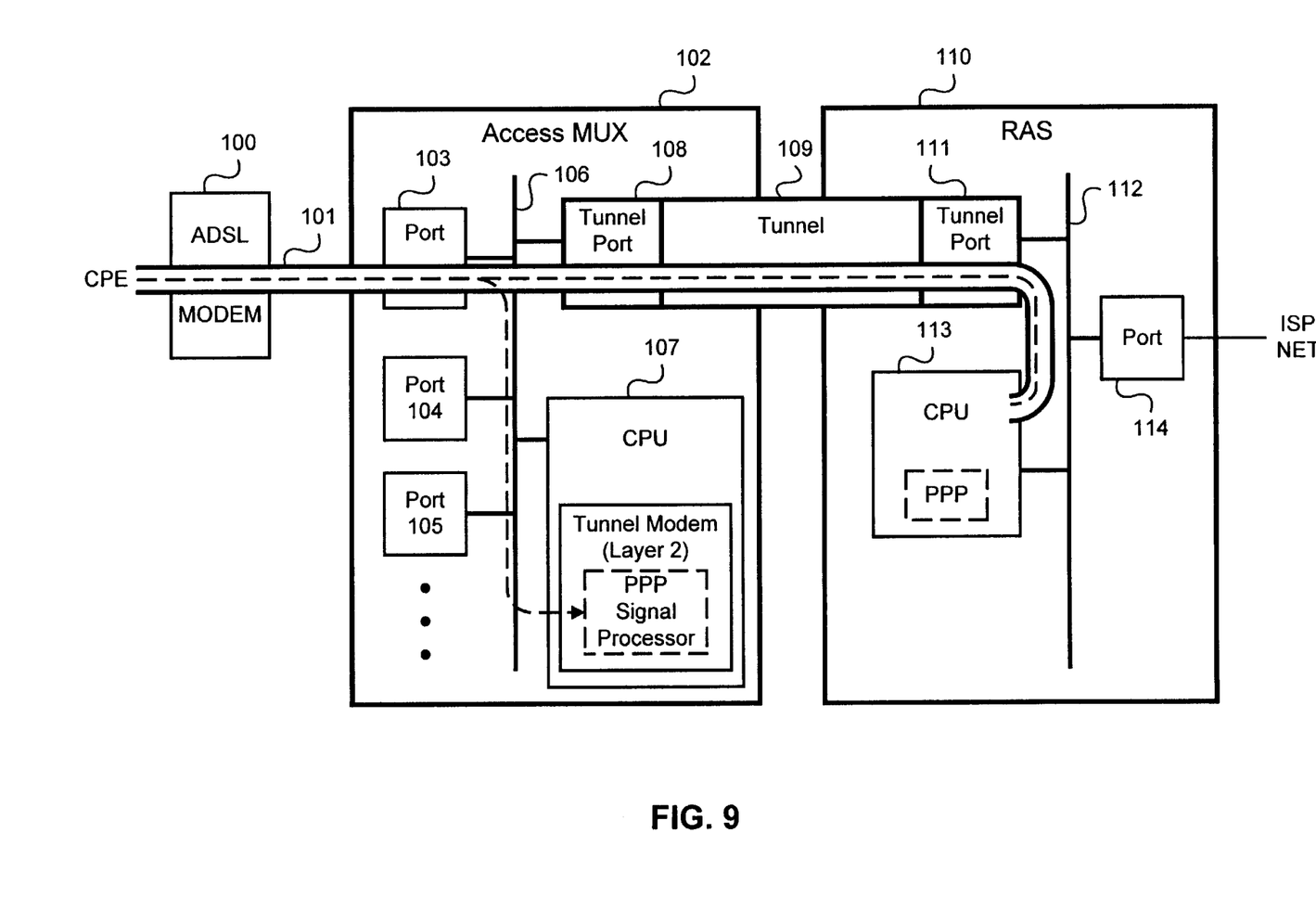
FIG. 9 is a more detailed diagram of a point-to-point communication channel including a signaling channel according to the present invention, where the point-to-point communication channel is established between a customer premises equipment CPE and a remote access server RAS.

FIG. 9 is representative of one example implementation of an access multiplexer and a remote access server according to the present invention. In FIG. 9, an ADSL modem is coupled to customer premises equipment CPE as an end point of a point-to-point session 101. The point-to-point session 101 is established through an access multiplexer 102. The access multiplexer 102 includes a port 103 for communication with the modem 100. Also, a plurality of other ports may be included in the access multiplexer 102 such as ports 104 and 105. The ports 103–105 are coupled to a bus 106. A central processing unit 107 is coupled to the bus 106. The central processing unit 107 includes tunnel management resources for layer 2 tunneling and a point-to-point protocol signal channel processor. Also coupled to the bus 106 is a port 108 for connection across a backbone communication channel, such as a layer 2 tunnel protocol L2TP tunnel 109. The CPU 107 monitors frames received on port 103 and performs edge functions for transferring the frames through the tunnel 109 to the destination, such as a remote access server 110. The remote access server includes a tunnel port 111, which is coupled to a backbone bus 112. The backbone bus is coupled to a central processing unit 113 in the remote access server which includes a point-to-point protocol module. Also, the remote access server 110 includes a port 114 for connection to a local network, such as an Internet service provider network.

The ports 103–105 include filters for recognizing signaling channel frames, and signaling the CPU 107 that PPP signaling processing is required. Alternatively, frames received on ports 103–105 are monitored by software executed by the CPU 107 for edge processing and for PPP signal channel processing.

Figure 10:
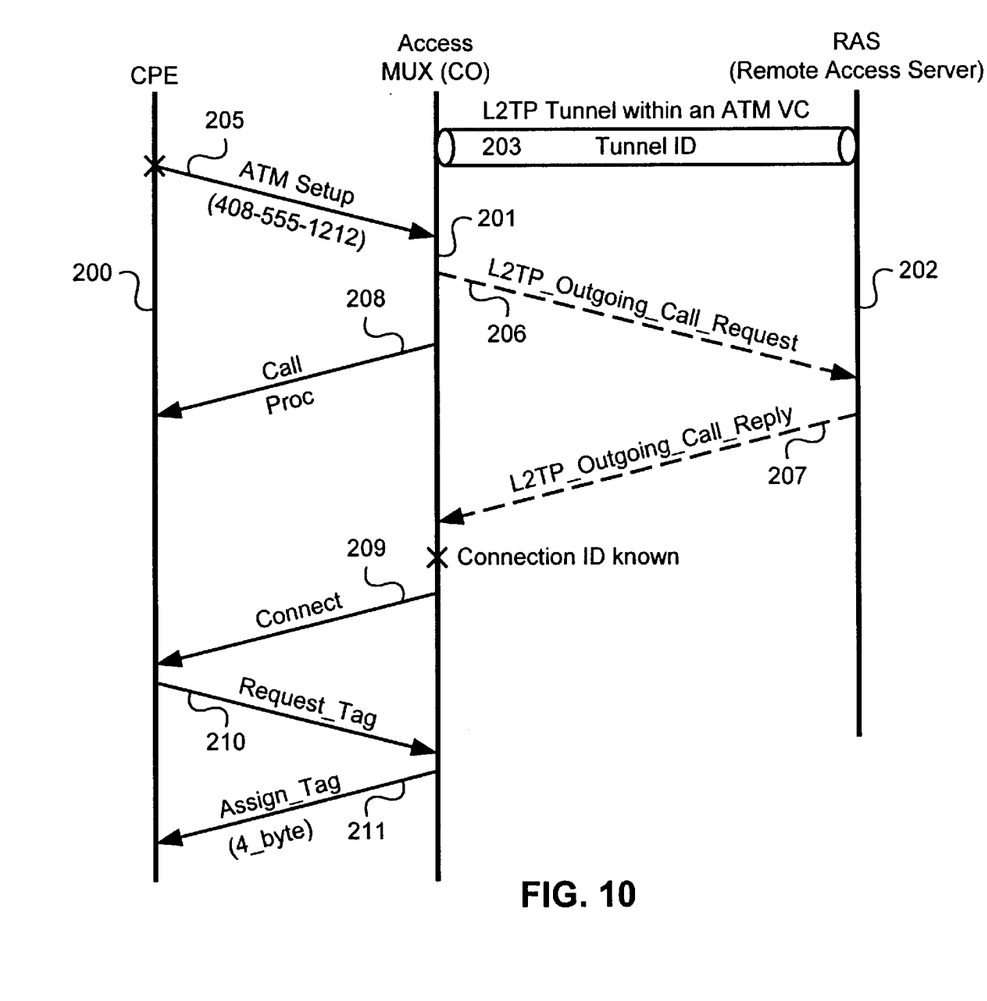
FIG. 10 illustrates the signals generated according to the enhanced point-to-point protocol of the present invention for one example function implemented in the signaling channel.

FIG. 10 illustrates signaling exchange according to one example implementation of a point-to-point communication channel according to the present invention. In FIG. 10, the customer premises equipment is represented by the vertical bar 200. The access multiplexer at the central office, or elsewhere in the telephone access provider network, is represented by the vertical bar 201. The remote access server, or other peer end point of the point-to-point channel is represented by the vertical bar 202. In this example, the access multiplexer 201 and the remote access server 202 set up a layer 2 tunneling protocol L2TP tunnel 203. This provides high bandwidth communication for a plurality of point-to-point channels between the access multiplexer 201 and the remote access server 202. In this example, the tunnel 203 is implemented across an ATM virtual circuit within the telephone access provider network.

The customer premises equipment initiates a point-to-point protocol channel by issuing an ATM setup signal 205. The access multiplexer 201 transfers a layer 2 tunneling protocol outgoing call request message 206 to the remote access server 202. The remote access server responds with an outgoing call reply message according to the layer 2 tunneling protocol 207. Meantime, the access multiplexer 201 may issue call proceeding messages 208 to the CPE 200.

Upon receiving an outgoing call reply signal 207, the access multiplexer has established a connection identifier—the Tunnel ID and the Call ID fields. The connection identifier being known, a connect signal 209 is issued to the customer premises equipment establishing a channel for a point-to-point connection, by which a communication with the remote access server 201 is provided. According to the present invention the CPE issues a frame according to the PPP protocol with a signal for the access multiplexer. In this example, the frame is a signaling protocol frame having a field in the protocol field of the PPP encapsulation identifying "a request for tag" message 210. The access multiplexer 201 recognizes the signaling channel frame, and responds within "assign tag" message 211 using the signaling channel of the point-to-point protocol. In this embodiment, the tag comprises the tunnel ID and call ID fields according to the layer 2 tunneling protocol. The CPE 200 is thus enabled to assist the access multiplexer in providing encapsulation for the tunnel 203. For example, the tunnel ID and call ID tags are appended to the PPP frame in the appropriate locations, such as the head of the protocol field of the PPP encapsulation. The function of adding the tag to the packet is thus removed from the access multiplexer 201, and the function transferred to the customer premises equipment.

Depending on the characteristics of the tunnel 203 or other backbone network protocol utilized by the access multiplexer, the CPE 200 can use its abundant processing resources to assist in the edge functions. For example, the protocol and information fields in the PPP frame can be setup with sizes that reduce the amount of fragmentation required at the access multiplexer. In addition, protocol information can be inserted within the PPP information field at appropriate locations to assist in network operation. Another example of an edge function that could be performed by the CPE includes performing flow control (using send and receive sequence numbers) in the L2TP header. This would require more than the 6-byte minimum needed to hold the tunnel IDs and call IDs for each direction could be used. Thus, the PPP extension provided by this invention allows the access provider to distribute some of the multiplexing processing to individual CPE. The access provider equipment understands the control plane of the multiplexing/tunneling protocol used by the backbone network, and negotiates with the Internet service provider equipment, or with other intermediate network devices, according to these protocols. As a result of these control plane interactions, data plane encapsulations are determined. The access equipment then uses the signaling channel of the PPP enhancement of the present invention to inform the CPE to encapsulate the PPP data in a certain way. In this scheme, the CPE helps with data plane multiplexing activities without having to be aware of the details in control plane of the multiplexing protocol.

This example of the invention presents a method to make the operation of the access multiplexer simpler and more efficient when performing this multiplexing task towards the ISP RAS and demultiplexing task towards the CPE. First, let's consider how the access multiplexer would have to work today (without the capabilities described in this invention):

In the direction from the Access Multiplexer towards the ISP RAS:

1. Assume that the access multiplexer has an L2TP tunnel existing between itself and the ISP RAS (running over some ATM VC).
2. On receipt of a new VC from an ADSL endpoint, the access multiplexer would negotiate with the ISP RAS for a new Call ID within an existing tunnel (or it would establish a new VC and tunnel, and then negotiate for a new Call ID).
3. As the cells from the ADSL CPE arrive at the access multiplexer, it will use the PTI bit to aggregate cells into PPP packet. It will then prefix a complete PPP packet with the appropriate L2TP header. It will then use AAL5 adaptation and then segment the AAL5 adapted L2TP packets into cells.

In the direction from the ISP RAS to the CPE:

1. The access multiplexer will receive cells from the ISP RAS. Using the PTI bit, it will assemble these cells into the AAL5 frame, and extract the L2TP frame.
2. Using stored information, the access multiplexer will map the L2TP Tunnel ID and Call ID to a VC to a particular ADSL CPE.
3. The access multiplexer will extract the PPP data from the L2TP frame, and using AAL5 adaptation, send the data to the ADSL CPE.

Note that in the scheme described above, the multiplexing activities of the access multiplexer were transparent to the ADSL CPE. However, there are several drawbacks to the scheme described above:

1. The access multiplexer needs to reassemble cells into frames, add the L2TP header, and then resegment the frames into cells towards the ISP RAS. Repeating this operation over thousands of subscriber sessions puts a computation strain on the resources of the access multiplexer. There is a coincident cost associated with needing to do such operations.
2. In the direction from the ISP RAS towards the ADSL CPE, the access multiplexer again needs to reassemble cells into frames. It needs to extract the PPP data, determine the ADSL endpoint, perform AAL5 adaptation, and segment frames into cells. There is a coincident cost associated with needing to do such operations.

This invention describes a means of distributing some of the protocol processing to ADSL endpoints. This distribution occurs without the ADSL endpoints needing to be aware of the intricacies of the multiplexing scheme being used (L2TP in the examples used here). Using the procedure described in this invention, segmentation of frames into cells occurs only once for traffic that is sent from the CPE to the ISP RAS via the access multiplexer or for traffic from the ISP RAS to the CPE via the access multiplexer. This occurs while using the same multiplexing means as described earlier in this document.

The procedure makes use of the PPP Signaling Channel between the ADSL endpoints and the access multiplexer. The access multiplexer would then work as follows on receipt of a new VC being setup from an ADSL endpoint (using the PPP-ATM-ADSL stack) for data from that endpoint towards the RAS:

1. On receipt of a new ATM VC from an ADSL endpoint, the access multiplexer negotiates with the ISP RAS for a new Call ID within an L2TP Tunnel. As a result of this negotiation involving the L2TP control plane, the access multiplexer now has complete information on the L2TP tag that has to be prepended to PPP data from a particular CPE session being sent to the ISP RAS. It is assumed here that no send sequence number (N(S)) or receive sequence number (N(R)) is used in the L2TP tunnel. This leads to a minimum L2TP header of 6 bytes.
2. Via the signaling channel, the access multiplexer informs the CPE to prefix a 6 byte sequence to all PPP frames. This 6 byte sequence corresponds to the minimal L2TP encapsulation described earlier. It uses a command with the functionality of the Add_Tag command to inform the CPE of the 6 bytes to prepend to the PPP data. The CPE has no idea of the meaning of these 6 bytes. They could correspond to any multiplexing scheme used by the access multiplexer. In our example, the multiplexing scheme used for illustrative purposes is L2TP. A positive acknowledgment would allow the access multiplexer to know that the Add_Tag command was successful at the CPE. It would mean that the CPE was prepending the bytes specified in the Add_Tag command to any PPP data frames that it was sending out, before using AAL5 adaptation on these frames and segmenting the frames into cells.

3. Now, any cells associated with the new VC from the CPE can be forwarded on the VC to the ISP RAS without reassembly/processing/resegmentation. This makes the job of the access multiplexer much easier. Note that all the cells from a particular frame have to be sent consecutively towards the RAS before cells from some other frame are sent on the same VC to the RAS.

4. Note that signaling channel frames are not prepended by the tag. Only data frames destined for the ISP RAS are prepended with the tag. This means that the access multiplexer can quickly look into the first cell of a new frame from the CPE to see if it contains a signaling channel frame or not. If it does, this frame would be reassembled for processing by the access multiplexer. Otherwise, processing would proceed as described in the preceding items. Note that special hardware can be designed that makes this operation of looking into the first cell of a new frame to determine whether it is a signaling frame very efficient. When the CPE receives cells from the access multiplexer, it reassembles these cells into frames. It will look to see if the frame is a PPP signaling frame. If it is, the CPE will process it. Otherwise, it performs the processing described below.

Processing of data from the ISP RAS towards the ADSL endpoint would work as follows:

1. The access multiplexer would send a Remove_Tag command to inform the CPE that it should remove a certain number of bytes from the beginning of each frame it extracts from the AAL5 adaptation process. This is necessary since the access multiplexer will not be removing the L2TP multiplexing header prepended to PPP frames by the RAS.

2. The ISP RAS would look into the first cell of a new frame. (Note—the first cell of a new frame can be identified by looking at the PT bit. A cell with a PT bit of one or zero following a cell with a PT bit of 1 signifies the first cell of a new frame. The very first cell received from the ISP RAS is the first cell of a new frame.) It would then look at the first 6 bytes after the header in the aforementioned cell. If the very first bit of the first byte was a '1', this would mean that the frame being received was an L2TP control frame that needs to be terminated and processed by the access multiplexer. If the very first bit of the first byte was a '0', it would mean that an L2TP data payload frame was being transferred by the RAS. The access multiplexer would then check the L2TP Tunnel ID and Call ID associated with the frame (this is still part of the first 6 bytes of the first cell), and look into its tables to determine the CPE that the data is destined for. It would then forward the initial cell and the remaining cells associated with the frame to the appropriate CPE; the PT bit would be used to determine which cells correspond to the same frame. As mentioned earlier, special hardware can be designed that makes this operation of looking into the first cell of a new frame very efficient.

This invention allows efficient and fast operation of the equipment in carrier networks that is used to multiplex the data from several ADSL subscribers towards an ISP RAS. It makes use of the PPP signaling channel for coordination between the CPE and the access multiplexer; this channel was described in a previous invention. For the example provided here, the ADSL CPE use the PPP-ATM-ADSL stack; the access multiplexer takes data from individual ATM Virtual Circuits from ADSL subscribers and multiplexes the data onto a single Virtual Circuit towards the ISP RAS. The access multiplexer negotiates with the ISP RAS for the necessary L2TP Call ID. With this information, it knows the complete 6 byte header that the RAS expects to see for data associated with this particular session. It then informs the CPE to prepend these 6 bytes to any PPP payload frames. The fact that this prepending happens at the CPE means that the access multiplexer does not need to reassemble cells into frames, add the header, and segment frames into cells. Note that the prepending of the bytes happens at the CPE without the CPE needing to be aware of the complexities of the multiplexing protocol. In the direction from the ISP RAS towards the CPE, the access multiplexer looks at the first 6 bytes of the first cell of a new frame. If the frame is an L2TP data frame, it looks to find the CPE associated with that L2TP session, and relays the data on the appropriate Virtual Circuit to that CPE. Cells do not have to be reassembled into frames in order to remove the multiplexing header at the access multiplexer. Instead, the access multiplexer informs the CPE to remove the first 6 bytes of reassembled frames. Note that the CPE will only remove the first 6 bytes of such frames if it determines that the frame is not a PPP signaling frame (this can be determined easily by looking for the particular value in the first two bytes that corresponds to a Protocol field signifying the PPP signaling channel).

Another example use of the signaling channel supports multicast functions. When a dial out paradigm is being used for Internet access, there are different schemes for handling multicast. For example, each user can be sent an individual multicast stream from the Internet service provider. This is inefficient, since many users served by the same access provider's concentration/multiplexing equipment could be listening to the same multicast stream at the same quality of service or cost of service. A much more efficient use of access provider resources is to distribute a single stream from the ISP to the concentration/multiplexing equipment and have that equipment distribute the multicast data to individual subscribers, as can be accomplished using the signaling channel of the present invention.

Another example scheme for handling multicast arises if the concentration/multiplexing equipment is being used to achieve multicast efficiencies. In this case, prior art systems snoop the data from individual users to identify which users are joining a particular multicast groups, the quality of service needed by the users and other parameters. Such snooping is inefficient, since it requires looking into the layer 3 packet such as Internet Protocol IP packets. The inefficiency is compounded in cases where the customer premises equipment sends cells to the concentration/multiplexing equipment, for example in the case of point-to-point protocol over ATM over ADSL. In this case, cells need to be reassembled into frames, the snooping operation executed, and then frames segmented back into cells for transfer through the network.

The PPP signaling channel extension of the present invention provides the means of alleviating these multicast inefficiencies by allowing the access providers concentration/multiplexing equipment to negotiate over the signaling channels with the CPE to divert pertinent multicast frames, for example IGMP and RSVP frames involving multicast groups. Based on the received IGMP and RSVP frames, the access providers concentration/multiplexing equipment becomes a distribution point for multicast feeds, resulting in a feed from the ISP being distributed to many served users by the concentration/multiplexing equipment.

For another example, consider that a network address translator NAT is used today to allow multiple CPE behind the NAT to use a single IP address or a small set of IP addresses in interactions with the external world. Nodes in the customer premises typically have individual local IP addresses, but are known to the outside world via a single or small set of global IP addresses. The data from CPE initiated sessions is mapped to new ports, and one of the global IP addresses by the NAT. This process works well for example for outgoing sessions initiated by CPE for example file transfer protocol FTP sessions.

The PPP signaling channel as described in this invention can be used as a coordination mechanism between the ISP remote access server, and a CPE network address translator. For example, in cases where remote entities contact the end points behind the CPE via the remote access server, the signaling channel can be used for control plane interactions between the remote access server and the network address translator to determine which end user behind the network address translator should receive the data. This allows for other addressing, such as name based addressing or E.164 addressing, to supplement the global IP addresses assigned by the Internet service provider to the NAT, to be used to identify individual users behind the NAT. It allows for IP address conservation which is one of the goals of the NAT, while making it possible to have individual user visibility behind the NAT.

For yet another example, consider that several allowed protocol stacks have been defined for ADSL links. One such protocol stack is PPP-ADSL stack. Typically this stack contains no means for setting up individual sessions to different ISPs, and identifying via different encapsulation the data that is destined for a particular ISP. With the definition of the signaling channel, the access equipment is allowed to interact with CPE to determine the ISP that a user wishes to use for a particular session, and to allocate a unique value for the HDLC address field or other framing field that could be used by the CPE to encapsulate data for this session. Note that different PPP sessions to different ISPs each have their own associated signaling channel to realize advantages described earlier. The unique HDLC address is used by the access providers concentration/multiplexing equipment for fast forwarding to the ISP that the data is destined for.

Figure 11:
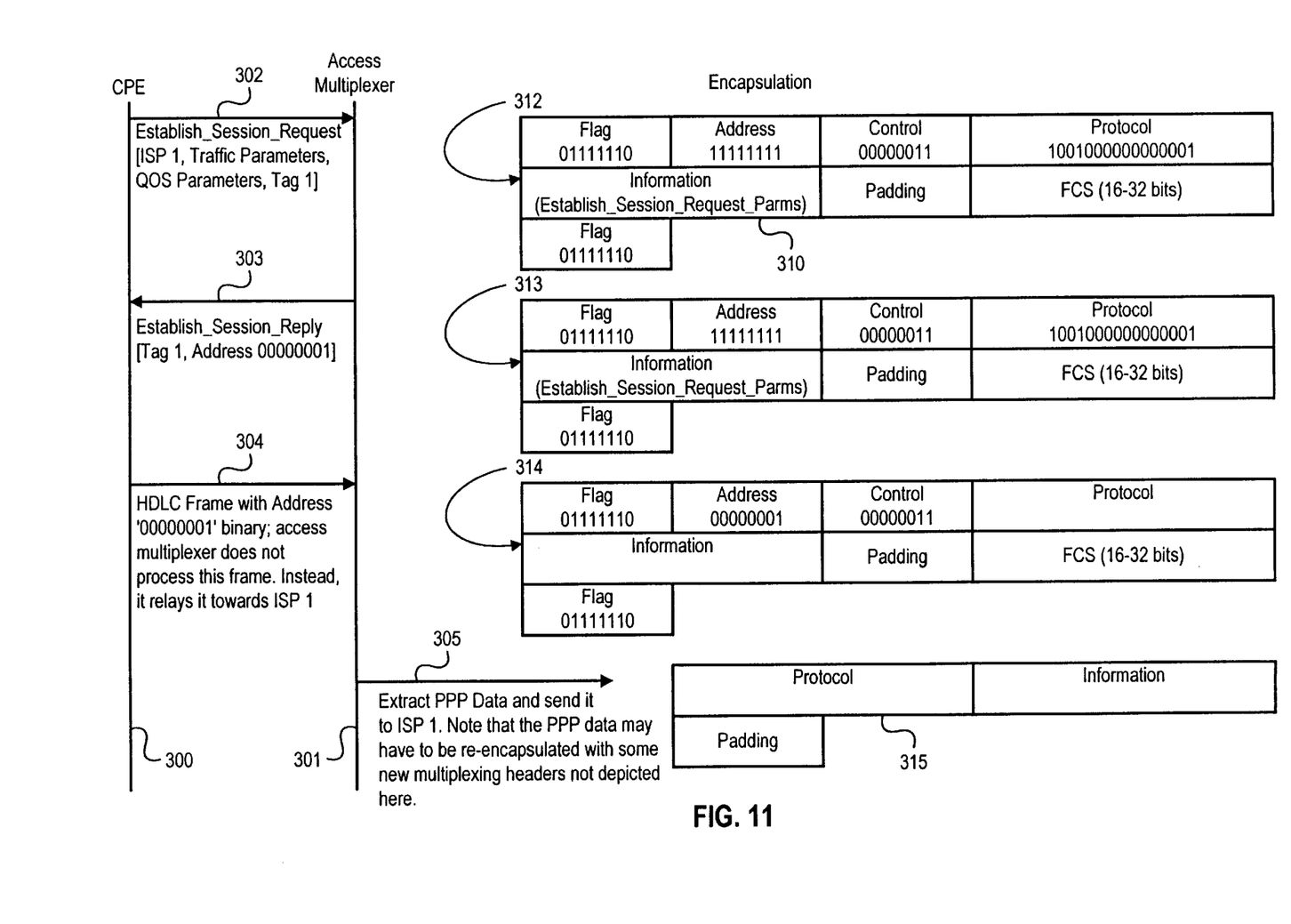
FIG. 11 illustrates the process of establishing a session to an Internet Service Provider for a static link environment.

Suppose the Customer Premises Equipment (CPE) wishes to establish a session to Internet Service Provider 1 (ISP 1). First, the CPE could go through the normal LCP negotiation with the Access Multiplexer. This LCP negotiation is used to automatically agree upon the encapsulation format options, handle varying limits on sizes of packets, detect a looped-back link and other common misconfiguration errors, and terminate the link. It would then follow the sequence of steps shown in the stick diagram in FIG. 11. In FIG. 11, the stick diagram shows the high level view of the exchanges occurring between the CPE and the Access Multiplexer 301. The Encapsulation part to the right of the stick diagram provides an example encoding of the HDLC frames exchanged between the CPE 300 and the Access Multiplexer 301 and the PPP frames exchanged between the Access Multiplexer 301 and the Remote Access Server (RAS) of some ISP.

First, the CPE 300 sends an Establish_Session_Request 302 to the Access Multiplexer 301, requesting that a session be established to ISP 1. Included in this request is a Tag parameter (e.g. in Information field 310) so that the CPE can match a response from the access multiplexer to this request via the Tag. Also included is the Name and/or Address of the ISP, and other pertinent information relevant to the session to the particular ISP—for example, the Quality of Service (QOS) required for the session, and the bandwidth requirements for the session. Note the encapsulation 312 for the Establish_Session_Request—it is sent in an HDLC Frame with an Address of '11111111' and has the Protocol field set to the value used for the Signaling Channel.

On receipt of the Establish_Session_Request 302, the Access Multiplexer 301 on seeing that a frame with an Address of '11111111' with a Protocol field indicating the Signaling Channel has been received, knows that it needs to process the frame. It processes the frame and determines that the CPE is trying to establish a new session to ISP 1. It checks to see if it can provide the session to ISP 1 at the required traffic parameter specifications and the requires QOS. If necessary, it may need to establish a new connection to ISP 1. If everything goes fine, it returns an Establish_Session_Reply 303 to the CPE indicating that the request can be met, encapsulated as shown at 313. It informs the CPE that future PPP data associated with this session to ISP 1 should be encapsulated within HDLC frames with an Address field of '00000001' binary. (Note—if the session could not be established for some reason, the Access Multiplexer would return a negative response to the Establish_Session_Request).

Future PPP data 304 for ISP 1 will be encapsulated within HDLC frames 314 with an Address filed of '00000001' binary. When the Access Multiplexer 301 receives frames with such an address field, it immediately extracts the PPP data and forwards it onwards on a connection to ISP 1.

If the CPE now wants to establish a second session, this time to ISP 2, it will go through the session establishment procedure again, this time using ISP 2's Name and Address in the Establish_Session_Request 302. If this new session can be established, the Access Multiplexer 301 will return 303 a unique value to be used for the Address field of HDLC frames that contain PPP data destined for ISP 2. For example, it could return a value of '00000010' binary. Now, whenever the Access Multiplexer 301 receives HDLC frames 304 with an Address field of '00000001' binary, it will extract the data and relay it to ISP 2. When it receives HDLC frames with an Address filed of '00000010' binary, it will extract the data and relay it to ISP 2.

In the opposite direction, PPP data from ISP 1 received by the Access Multiplexer will be encapsulated into HDLC frames with an Address field of '00000001' before being relayed to the CPE. Similarly, PPP data from ISP 2 received by the Access Multiplexer will be encapsulated into HDLC frames with an Address field of '00000010' before being relayed to the CPE.

Accordingly, the present invention provides an extension to the point-to-point protocol that allows for interactions between end points of the point-to-point session and intermediate network devices involved in the transfer of data between the end points. The channel is used to relieve congestion in the intermediate devices that arise due to edge function like protocol processing, multicast distribution, limited user visibility behind a NAT and the inability to dynamically select an Internet service provider or other end point for ADSL or related links.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. In a system including a network having one or more intermediate devices coupled to end stations by respective links, and through which a point-to-point data channel is established from a first end station through a first intermediate device through the network to a second end station, the point-to-point data channel operating according to a communication protocol between the first and second end stations, the first intermediate device including resources for managing use of bandwidth in the network, a method for improving network performance, comprising:

detecting in the first intermediate device data frames in the point-to-point data channel the data frames being formatted according to the first communication protocol;

processing said data frames in the intermediate device for transmission through the network using the resources for managing use of network bandwidth; and transmitting from the first intermediate device to the first end station information related to the management of network bandwidth in a data frame formatted according to the first communication protocol.

2. The method of claim 1, wherein the processing said data frames includes encapsulating at least a portion of said data frames according to a second communication protocol for transmission through at least a portion of the network, and wherein the information related to management of network resources includes data enabling the first end station to reduce processing steps in said encapsulating by processing data frames formatted according to the first communication protocol for the point-to-point communication channel.

3. The method of claim 1, wherein the first communication protocol comprises a Point to Point Protocol PPP.

4. The method of claim 3, wherein the data frames include a reserved field, and said transmitting includes sending a frame including PPP packet from the intermediate device to the end station, including a code in the reserved field indicating that a signal related to the management of network resources is carried in the data frame.

5. The method of claim 4, wherein the reserved field comprises a protocol field specified for PPP protocol identification functions.

6. The method of claim 1, wherein the resources for management of network bandwidth comprise resources for executing a layer 2 tunneling protocol L2TP.

7. The method of claim 2, wherein said encapsulating includes generating encapsulation data and constructing network packets including the encapsulation data, and wherein the information relating to the management of network resources includes data enabling the first end station to provide at least a portion of the encapsulation data in data frames formatted according to the first communication protocol.

8. The method of claim 1, wherein the resources for management of network bandwidth include multicast distribution resources by which a single multicast packet from the first end station is forwarded to a plurality of recipients by the intermediate device, and wherein the information related to the management of network bandwidth includes data related to the multicast distribution resources.

9. The method of claim 1, including:

receiving a data frame formatted according to the first communication protocol at the first intermediate device including information originating in the end station related to management of network bandwidth.

10. The method of claim 8, including:

receiving a data frame formatted according to the first communication protocol at the first intermediate device including information originating in the end station related to management of network bandwidth; wherein the information originating from the end station includes data related to the multicast distribution resources.

11. In a system including a network having one or more intermediate devices coupled to end stations by respective links, and through which a point-to-point data channel is established from a first end station through a first intermediate device through the network to a second end station, the point to point data channel operating according to a first communication protocol between the first and second end stations, the first intermediate device including resources for managing use of network resources, a method for improving network performance, comprising:

establishing the point-to-point data channel for carrying data frames formatted according to the first communication protocol; and transmitting a data frame in the point-to-point data channel formatted according to the first communication protocol including information directed to the first intermediate device related to managing use of network resources.

12. The method of claim 11, wherein the first intermediate device comprises resources for encapsulating said data frames according to a second communication protocol for transmission through at least a portion of the network, and the information related to managing use of network resources includes data enabling the first intermediate device to reduce processing steps in said encapsulating.

13. The method of claim 11, wherein the first communication protocol comprises a Point to Point Protocol PPP.

14. The method of claim 13, wherein the data frames include a reserved field, and said transmitting includes sending a frame including a PPP packet from the intermediate device to the end station, including a code in the reserved field indicating that information related to managing use of network resources is carried in the data frame.

15. The method of claim 14, wherein the reserved field comprises a protocol field specified for PPP protocol identification functions.

16. The method of claim 11, wherein the resources for managing use of network resources comprise resources for executing a layer 2 tunneling protocol L2TP.

17. The method of claim 12, wherein said encapsulating includes generating encapsulation data and constructing network data packets including the encapsulation data, and wherein the information relating to the management of network resources includes data enabling the first end station to provide at least a portion of the encapsulation data in data frames formatted according to the first communication protocol.

18. The method of claim 11, wherein the resources for managing use of network resources includes multicast distribution resources by which a single multicast packet from the first end station is forwarded to a plurality of recipients by the intermediate device, and wherein the information related to the managing use of network resources includes data related to the multicast distribution resources.

19. The method of claim 11, including:

receiving a data frame formatted according to the first communication protocol at the first end station including information originating in the first intermediate device related to management of network bandwidth.

20. The method of claim 18, including:

receiving a data frame formatted according to the first communication protocol at the first end station including information originating in the first intermediate device related to managing use of network resources; wherein the information originating from the first intermediate device includes data related to the multicast distribution resources.

* * * * *